(12) United States Patent
Oh et al.

(10) Patent No.: US 10,759,979 B2
(45) Date of Patent: Sep. 1, 2020

(54) ADHESIVE COMPOSITION

(71) Applicant: LG Chem, Ltd., Seoul (KR)

(72) Inventors: Wan Kyu Oh, Daejeon (KR); Seung Young Park, Daejeon (KR); Gyeong Shin Choi, Daejeon (KR)

(73) Assignee: LG Chem, Ltd. (KR)

( * ) Notice: Subject to any disclaimer, the term of this patent is extended or adjusted under 35 U.S.C. 154(b) by 143 days.

(21) Appl. No.: 16/091,670

(22) PCT Filed: Dec. 21, 2017

(86) PCT No.: PCT/KR2017/015259
§ 371 (c)(1),
(2) Date: Oct. 5, 2018

(87) PCT Pub. No.: WO2018/155801
PCT Pub. Date: Aug. 30, 2018

(65) Prior Publication Data
US 2019/0153271 A1 May 23, 2019

(30) Foreign Application Priority Data
Feb. 22, 2017 (KR) .................. 10-2017-0023724

(51) Int. Cl.
*C09J 133/12* (2006.01)
*C09J 4/06* (2006.01)
*C09J 133/08* (2006.01)
*C09J 163/00* (2006.01)
*C09J 11/04* (2006.01)
*C09J 11/08* (2006.01)
*C08K 3/04* (2006.01)
*C08F 20/18* (2006.01)
*C08F 279/04* (2006.01)
*C08G 59/02* (2006.01)
*C08K 3/34* (2006.01)
*C08K 3/36* (2006.01)

(52) U.S. Cl.
CPC .............. *C09J 133/12* (2013.01); *C09J 4/06* (2013.01); *C09J 11/04* (2013.01); *C09J 11/08* (2013.01); *C09J 133/08* (2013.01); *C09J 163/00* (2013.01); *C08F 20/18* (2013.01); *C08F 279/04* (2013.01); *C08G 59/02* (2013.01); *C08K 3/041* (2017.05); *C08K 3/346* (2013.01); *C08K 3/36* (2013.01)

(58) Field of Classification Search
CPC ........ C09J 133/08; C09J 133/10; C09J 11/08; C09J 63/00; C08K 3/36
See application file for complete search history.

(56) References Cited

U.S. PATENT DOCUMENTS

| 4,223,115 | A | 9/1980 | Zalucha et al. |
| 4,452,944 | A | 6/1984 | Dawdy |
| 4,857,131 | A | 8/1989 | Damico et al. |
| 5,264,525 | A * | 11/1993 | Lees ............... C08L 63/00 252/182.15 |
| 6,180,199 | B1 | 1/2001 | Herring, Jr. et al. |
| 6,291,593 | B1 | 9/2001 | Cheng |
| 6,433,091 | B1 | 8/2002 | Cheng |
| 6,512,043 | B2 | 1/2003 | Wang et al. |
| 6,939,932 | B2 | 9/2005 | Kneafsey et al. |
| 7,479,528 | B2 | 1/2009 | Wang et al. |
| 7,776,963 | B2 | 8/2010 | Wang et al. |
| 7,956,143 | B1 | 6/2011 | Xia et al. |
| 8,119,754 | B2 | 2/2012 | Levandoski et al. |
| 8,202,932 | B2 | 6/2012 | Kneafsey et al. |
| 8,362,120 | B2 | 1/2013 | Huang et al. |
| 9,315,701 | B2 | 4/2016 | Wang et al. |
| 9,416,299 | B2 | 8/2016 | Kropp et al. |
| 9,657,203 | B2 | 5/2017 | Murray et al. |
| 9,732,257 | B2 | 8/2017 | Houlihan et al. |
| 9,896,607 | B2 | 2/2018 | Hill et al. |
| 2004/0229990 | A1 | 11/2004 | Righettini et al. |
| 2013/0053497 | A1 | 2/2013 | Tully et al. |
| 2013/0261221 | A1 | 10/2013 | Bosnyak et al. |
| 2014/0186553 | A1 | 7/2014 | Jung |
| 2014/0235758 | A1 | 8/2014 | Cheng et al. |
| 2015/0376473 | A1 | 12/2015 | Khongal et al. |

FOREIGN PATENT DOCUMENTS

| CN | 103958628 A | 7/2014 |
| CN | 104479603 A | 4/2015 |
| EP | 0086469 B1 | 1/1985 |
| EP | 0270318 B1 | 4/1992 |
| EP | 0278642 B1 | 8/1993 |
| EP | 0357304 B1 | 3/1994 |
| EP | 1187888 B1 | 11/2004 |
| EP | 1086185 B1 | 5/2007 |
| JP | 2006002012 A | 1/2006 |

(Continued)

OTHER PUBLICATIONS

"Practical encyclopedia of new technology application of the latest new engineering material production and R&D of new products and industry technical standards", Xueyuan Audiovisual Press, Nov. 2004, p. 335, (Partial translation only).
Chinese Search Report for Application No. CN2017800226353 dated Mar. 4, 2020.
Liu Shi-Luan et al., "Experimental Study of Multi-wall Carbon Nanotubes Modified Cyanoacrylate Medical Adhesive", Chinese Medical Equipment Journal, Jan. 2013, vol. 34, No. 1, p. 12-14. (Abstract Only).
International Search Report for PCT/KR2017/015259, dated Mar. 30, 2018.

* cited by examiner

Primary Examiner — Kuo Liang Peng
(74) Attorney, Agent, or Firm — Lerner, David, Littenberg, Krumholz & Mentlik, LLP

(57) ABSTRACT

In the present invention, there is provided an adhesive composition which comprises carbon nanotubes and thus, exhibits high adhesive strength due to excellent lap shear strength.

18 Claims, No Drawings

(56) References Cited

FOREIGN PATENT DOCUMENTS

| KR | 19880014069 A | 7/1990 |
|----|---------------|--------|
| KR | 950009831 B1 | 8/1995 |
| KR | 1019930018000 A | 8/1995 |
| KR | 20110094812 A | 8/2011 |
| KR | 20120087494 A | 8/2012 |
| KR | 20140017482 A | 2/2014 |
| KR | 20140045309 A | 4/2014 |
| KR | 20140088475 A | 7/2014 |
| KR | 20140092362 A | 7/2014 |

ADHESIVE COMPOSITION

CROSS-REFERENCE TO RELATED APPLICATION

This application is a national phase entry under 35 U.S.C. § 371 of International Application No. PCT/KR2017/015259, filed Dec. 21, 2017 which claims priority to Korean Patent Application No. 10-2017-0023724, filed on Feb. 22, 2017, the disclosures of which are incorporated herein by reference.

TECHNICAL FIELD

The present invention relates to a two-part adhesive composition exhibiting high adhesive strength due to excellent lap shear strength.

BACKGROUND ART

Two-part acrylic adhesive is advantageous in that it can be cured at room temperature, can adhere in a large area, is quickly cured and exhibit adhesiveness to various plastics, and thus it is used in the field such as automobile, building, marine, wind power, etc.

However, the two-part acrylic adhesive is disadvantageous in that the adhesive strength is lower than that of the one-part epoxy adhesive and the elongation is lower than that of the urethane adhesive. Consequently, its usage is limited in fields of application requiring stronger adhesive strength such as structural adhesives for vehicles, and high elongation such as adhesion outside the vehicle.

There is also a trade-off relationship between flexibility/toughness and strength in various adhesive compositions. Usually, in order to increase flexibility and toughness in the adhesive composition, a rubbery polymer is added, but the addition of such a rubbery polymer tends to adversely affect the modulus and ultimately the strength of the adhesive. Therefore, there is a demand for development of an adhesive composition exhibiting excellent adhesiveness without sacrificing strength.

PRIOR ART LITERATURE

Patent Literature (Patent Literature 1) U.S. Pat. No. 6,180,199

DETAILED DESCRIPTION OF THE INVENTION

Technical Problem

It is an object of the present invention to provide an adhesive composition exhibiting high adhesive strength due to excellent lap shear strength.

Technical Solution

According to one embodiment of the present invention, there is provided a two-part adhesive composition comprising: (A) a first part comprising the following components (a1) to (a5); and (B) a second part comprising the following components (b1) and (b2), based on the total weight of the adhesive composition:

(a1) 30 to 70% by weight of an alkyl(meth)acrylate; (a2) 1 to 10% by weight of an acrylate containing one or more hydroxy groups in the molecule; (a3) 20 to 40% by weight of a toughening agent; (a4) 1 to 10% by weight of a filler, and (a5) 0.01 to 1% by weight of a carbon nanotube, (b1) 1 to 10% by weight of an epoxy resin, and (b2) 1 to 5% by weight of an initiator.

Advantageous Effects

The adhesive composition according to the present invention includes carbon nanotubes and thus, exhibits high adhesive strength due to excellent lap shear strength. Accordingly, it can exhibit excellent adhesive properties to metal and plastic substrates, and can be used as an adhesive in various fields such as automobile, building, marine, wind power, and the like.

DETAILED DESCRIPTION OF THE EMBODIMENTS

Hereinafter, the two-part acrylic adhesive according to a specific embodiment of the present invention, a method for preparing the same, and the like will be described.

According to one embodiment of the invention, there is provided a two-part adhesive composition comprising: (A) a first part comprising the following components (a1) to (a5); and (B) a second part comprising the following components (b1) and (b2), based on the total weight of the adhesive composition:

(a1) 30 to 70% by weight of an alkyl(meth)acrylate;
(a2) 1 to 10% by weight of an acrylate containing one or more hydroxy groups in the molecule;
(a3) 20 to 40% by weight of a toughening agent;
(a4) 1 to 10% by weight of a filler,
(a5) 0.01 to 1% by weight of a carbon nanotube.
(b1) 1 to 10% by weight of an epoxy resin, and
(b2) 1 to 5% by weight of an initiator.

As the above-mentioned adhesive composition includes carbon nanotubes, it can improve a lap shear strength, thereby exhibiting high adhesive strength.

Furthermore, in the adhesive composition according to one embodiment of the present invention, the effect of the invention can be further improved through adjustment of the types and physical properties of the respective components. The components will be described in more detail below.

(A) First Part

In an adhesive composition according to one embodiment of the present invention, the first part is a main part, comprising (a1) an alkyl(meth)acrylate; (a2) an acrylate containing one or more hydroxy groups in the molecule; (a3) a toughening agent; (a4) a filler; and (a5) a carbon nanotube.

(a1) Alkyl(meth)acrylate

In the present invention, the alkyl(meth)acrylate includes both an alkyl acrylate-based compound and an alkyl methacrylate-based compound. In the alkyl(meth)acrylate, the alkyl group may be a linear or branched alkyl group having 1 to 20 carbon atoms. When the number of carbon atoms in the alkyl group is more than 20, the glass transition temperature (Tg) of the adhesive composition may be increased or the adjustment of the adhesiveness may be difficult.

Specific examples of the alkyl(meth)acrylate include methyl methacrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, n-octyl(meth)acrylate, isooctyl(meth)acrylate, isononyl(meth)acrylate, lauryl(meth)acrylate or tetradecyl(meth)acrylate, or the like, and they may be used alone or two or more types thereof may be used in combination.

In consideration of the effect of improving the adhesiveness due to the adjustment of the number of carbon atoms in the alkyl(meth)acrylate, the alkyl group in the alkyl(meth) acrylate may be more specifically a linear or branched alkyl group having 1 to 4 carbon atoms, even more specifically methyl or ethyl.

Such an alkyl(meth)acrylate can be contained in an amount of 30 to 70% by weight based on the total weight of the adhesive composition, and when the content of the alkyl(meth)acrylate is within this range, the wetting property can be improved together with excellent adhesiveness. If the content of the alkyl(meth)acrylate is less than 30% by weight, the wetting properties between an adhesive and an adherend may be deteriorated. When it exceeds 70% by weight, the adhesive properties may be deteriorated. In consideration of the excellent effect due to the adjustment of the content of the alkyl(meth)acrylate in the adhesive composition, the alkyl(meth)acrylate may be contained more specifically in an amount of 50 to 60% by weight.

(a2) Acrylate Containing One or More Hydroxy Groups in the Molecule

The acrylate containing one or more hydroxy groups in the molecule improves the wetting property between the adhesive and the adherend, increases the formation of hydrogen bonds with the filler or the alkyl(meth)acrylate, increases the dispersibility of the toughening agent, thereby improving the adhesion property of the adhesive composition.

Specific examples of the acrylate containing one or more hydroxy groups in the molecule include 2-hydroxyethyl (meth)acrylate, 2-hydroxypropyl(meth)acrylate, 4-hydroxybutyl(meth)acrylate, 2-hydroxyethyleneglycol(meth)acrylate, 2-hydroxypropyleneglycol(meth)acrylate, or the like. They may be used alone or two or more types thereof may be used in combination. Considering the effect of improving the adhesiveness of the adhesive composition and improving the mechanical properties even among them, more specifically, 2-hydroxyethyl acrylate may be used.

The acrylate containing one or more hydroxy groups in the molecule can be contained in an amount of 1 to 10% by weight based on the total weight of the adhesive composition. When the content is less than 1% by weight, the wetting properties between the adhesive and the adherend may be deteriorated, and the formation of hydrogen bonds with the filler or alkyl(meth)acrylate may be deteriorated. Further, when the content exceeds 10% by weight, the dispersibility of the toughening agent may be lowered. Considering the excellent improvement effect due to the adjustment of the content of the acrylate containing one or more hydroxy groups in the molecule, it can be contained in an amount of 2 to 8% by weight based on the total weight of the adhesive composition.

(a3) Toughening Agent

The toughening agent serves to improve the mechanical properties in the adhesive composition and may include a rubber, a rubber copolymer or a rubber derivative.

Specific examples include butadiene-based rubber such as vinyl terminated butadiene rubber, chlorinated butadiene rubber, chlorosulfonated butadiene rubber, nitrile butadiene rubber (NBR) and styrene butadiene rubber (SBR); chlorosulfonated polyethylene; silicone rubber; a rubber copolymer such as styrene-butadiene-polymethylmethacrylate triblock copolymer, acrylonitrile-butadiene-styrene copolymer (or poly(acrylonitrile-butadiene-styrene)) and styrene-butadiene-styrene copolymer (or poly(styrene-butadiene-styrene)); or a rubber derivative, and they may be used alone or two or more types thereof may be used in combination.

Further, the toughening agent may include a core-shell rubber or may include a non-core shell rubber. The core-shell rubber may be "core shell" graft copolymer or a "shell-free" cross-linked rubber particles such as acrylonitrile-butadiene-styrene (ABS), methacrylate-butadiene-styrene (MBS) and methacrylate-acrylonitrile-butadiene-styrene (MABS).

Among the above-mentioned compounds, in consideration of the effects of improving the mechanical strength and the adhesive strength of the adhesive composition, the toughening agent may include a vinyl terminated butadiene rubber.

The vinyl terminated butadiene rubber may be liquid at room temperature and may have a glass transition temperature of less than 0° C. The vinyl terminated may be a (meth)acrylate-terminated form, such as a (meth)acrylate-terminated polybutadiene-acrylonitrile copolymer (e.g., HYCAR VTBN) or a (meth)acrylate-terminated polybutadiene (e.g., HYCAR VTB (Emerald Performance Polymers)). When the toughening agent includes a vinyl terminated butadiene rubber, the vinyl terminated butadiene rubber may be contained in an amount of 30% by weight or less, more specifically 10 to 30% by weight, and still more specifically 10 to 15% by weight based on the total weight of the toughening agent.

More specifically, in consideration of the remarkable effect of improving the mechanical strength and adhesive strength of the adhesive composition due to the effects of forming composites when used in combination with carbon nanotubes described below, the toughening agent includes a vinyl terminated butadiene rubber, a chlorosulfonated polyethylene, styrene-butadiene-styrene copolymer and acrylonitrile-butadiene-styrene copolymer. The vinyl terminated butadiene rubber can be contained in an amount of 10 to 30% by weight, more preferably 10 to 15% by weight, based on the total weight of the toughening agent.

The toughening agent as described above may be contained in an amount of 20 to 40% by weight based on the total weight of the adhesive composition. When the content of the toughening agent is less than 20% by weight, the mechanical properties of the adhesive composition may be deteriorated. When the content of the toughening agent is more than 40% by weight, adhesion with the substrate may be deteriorated. Considering the excellent improvement effect due to the adjustment of the content of the toughening agent in the adhesive composition, the toughening agent can be contained more specifically in 25 to 35% by weight.

(a4) Filler

The filler serves to improve the mechanical properties of the adhesive composition together with the toughening agent.

Examples of the filler may include silica, fumed silica, nanoclay and the like, and they may be used alone or two or more types thereof may be used in combination.

Among them, considering the effect of improving the flowability of the adhesive composition and the effect of improving the small particle strengthening property, the filler may include a silica-based filler such as silica and fumed silica. When including the effect of controlling the depression of the applied adhesive beads, it may include a fumed silica.

The filler may be contained in an amount of 1 to 10% by weight based on the total weight of the adhesive composition. When the content of the filler is less than 1% by weight, the effect of improving the mechanical properties can be lowered. When the content of the filler is more than 10% by weight, it is likely that the adhesion strength and the adhesion to the substrate is lowered. More specifically, it can be contained at 2 to 8% by weight.

(a5) Carbon Nanotubes

The carbon nanotube is a carbon structure in which honeycomb patterns, with interlocking hexagons of six carbons, are bonded to have a tube shape, and has a feature that it has a very larger aspect ratio. The carbon nanotube is excellent in mechanical properties, heat resistance, chemical resistance and the like, and thus has been frequently used as a filler for polymeric materials.

In the adhesive composition according to one embodiment of the present invention, the carbon nanotubes are positioned between the chains of the polymer resin used as a toughening agent, and exhibit the effects of forming composites via physical bonding. Consequently, the dispersibility in the adhesive composition is increased, thereby improving the mechanical properties, chemical resistance, adhesiveness and heat resistance.

The carbon nanotube may be specifically a single-walled carbon nanotube, a double-walled carbon nanotube, or a multi-walled carbon nanotube, and they may be used alone or two or more types thereof may be used in combination. Among them, considering the effect of improving the adhesiveness and the heat resistance, the carbon nanotube may be a multi-walled carbon nanotube.

In addition, the carbon nanotube has a diameter of several nanometers or several tens of nm and a length of several tens of μm, and as a result has a large aspect ratio. Specifically, the carbon nanotube may have an aspect ratio (ratio of length/diameter) of $1 \times 10^2$ to $1 \times 10^5$, more specifically $5 \times 10^2$ to $5 \times 10^4$. When the above aspect ratio range is satisfied, excellent dispersibility can be exhibited, and the effect of improvement due to the formation of composites with a toughening agent can be further enhanced.

Further, under the condition that the aspect ratio is satisfied, the diameter may be 1 to 50 nm, more specifically 5 to 20 nm, and even more specifically 8 to 15 nm, and the length may be 10 to 120 μm, more specifically 10 to 100 μm, and even more specifically 10 to 70 μm. By satisfying the above-mentioned aspect ratio as well as the diameter and length range, it is possible to exhibit dispersibility and effect of forming composites.

Moreover, the carbon nanotube may have a BET specific surface area of 150 $m^2/g$ or more, or 200 $m^2/g$ to 500 $m^2/g$, more specifically 220 to 300 $m^2/g$. By having such a large specific surface area, it is easy to form composites with the toughening agent, and as a result, a more excellent improvement effect can be exhibited. In the present invention, the BET specific surface area can be measured using a BET analyzer.

By having a high aspect ratio, a high specific surface area and a small diameter as described above, it is excellent in mixability with a polymer substrate and excellent in dispersibility in an adhesive composition.

Generally, carbon nanotubes have tendency to form aggregates due to their large surface area. The high polarized π-electron clouds in the carbon nanotubes results in a strong van der Waals force between the carbon nanotubes, thereby inhibiting the uniform dispersion. In order to prevent this, the carbon nanotubes can be used in the form of a dispersion solution dispersed in a dispersion medium. In this case, as the dispersion medium, there may be mentioned n-vinyl pyrrolidone, butyl acrylate, acrylic acid, benzoate ester-based oil, methyl methacrylate or the like. Among them, in consideration of the excellent compatibility with the carbon nanotubes and the storage stability, either or both of benzoate ester-based oil and methyl methacrylate may be used. Since the dispersion medium for dispersing the carbon nanotubes is a constituent component of the adhesive composition according to the present invention, it may be used by firstly blending and dispersing the carbon nanotubes with the above-mentioned compounds during the preparation of the adhesive composition, and then adding and mixing the remaining components.

Such carbon nanotubes may be contained in an amount of 0.01 to 1% by weight based on the total weight of the adhesive composition. When the content of the carbon nanotubes is less than 0.01% by weight, the effect of improving the adhesion strength due to the use of the carbon nanotubes is insignificant. Further, when the content of the carbon nanotubes exceeds 1% by weight, there is a possibility that the degree of dispersion is lowered and the adhesion to the substrate is lowered. Considering the excellent improvement effect due to the adjustment of the content of the carbon nanotube, the carbon nanotubes may be more specifically contained in an amount of 0.05 to 0.1% by weight based on the total weight of the adhesive composition.

Further, the carbon nanotube can be contained in an amount of 10 to 40 parts by weight based on 100 parts by weight of the toughening agent, under conditions that satisfy the above-mentioned content range. More specifically, the carbon nanotube can be contained in an amount of 15 to 35 parts by weight, more specifically 17 to 35 parts by weight. When the content of the carbon nanotubes relative to the toughening agent satisfies the above range, excellent effect of forming composites can be exhibited without deteriorating the dispersibility of the carbon nanotube in the adhesive composition, thereby further improving the adhesive strength.

(B) Second Part

In an adhesive composition according to one embodiment of the present invention, the (B) second part includes (b1) epoxy resin and (b2) initiator.

(b1) Epoxy Resin

The epoxy resin affects the dielectric constant and dielectric loss coefficient of the adhesive composition and the adhesive film produced therefrom, and plays a role in improving heat resistance and mechanical properties.

Thereby, the types of the epoxy resin are not particularly limited, but those having an epoxy equivalent of 200 g/eq to 500 g/eq can lower the dielectric constant and the dielectric loss coefficient while increasing the heat resistance of the adhesive composition.

Specific examples of the epoxy resin include cycloaliphatic epoxide, epoxy novolac resin, bisphenol-A epoxy resin, bisphenol-F epoxy resin, bisphenol-A epichlorohydrin epoxy resin, alkyl epoxide, dicyclopentadiene phenol addition reaction type epoxy resin, limonene dioxide, polyepoxide or the like, and they may be used alone or two or more types thereof may be used in combination.

The epoxy resin may be contained in an amount of 1 to 10% by weight based on the total weight of the adhesive composition. When the content of the epoxy resin is less than 1% by weight, the effect of improving the heat resistance and mechanical properties may be deteriorated. When the content is more than 10% by weight, the fluidity of the composition may be excessively increased. Considering the superiority of the improvement effect due to the adjustment of the content of the epoxy resin, the epoxy resin is contained in an amount of 2 to 5% by weight, more specifically 2 to 3% by weight, based on the total weight of the adhesive composition.

(b2) Initiator

The initiator serves to initiate a polymerization reaction through the provision of free radicals, and improvement in curing rate and adhesion strength can be expected depending on the types of initiator and the combination of curing accelerator. Specific examples thereof include hydrogen peroxide, alkyl peroxide, alkyl hydroperoxide, arylalkyl peroxide, peroxy ester, or the like, and they can be alone or two or more types thereof may be used in combination.

More specifically, the initiator may include diisopropylbenzene hydroperoxide, t-hexylhydroperoxide, 1,1,3,3-tetramethylbutyl hydroperoxide, dicumyl peroxide, t-butyl cumyl peroxide, methyl ethyl ketone peroxide, methyl isobutyl ketone peroxide, cyclohexanone peroxide, cumene hydroperoxide, t-butyl hydroperoxide, benzoyl peroxide, acetyl peroxide, lauroyl peroxide, 1,1-di(t-butylperoxy)cyclohexane, 1,1-di(t-butylperoxy) 3,3,5-trimethylcyclohexane, hydrogen peroxide, t-butyl peroxybenzoate, t-butyl peroxy 2-ethylhexanoate, bis(4-t-butylcyclohexyl)peroxydicarbonate, or mixtures thereof, among which benzoyl peroxide may be included.

Such an initiator may be contained in an amount of 0.1 to 5% by weight based on the total weight of the adhesive composition. When the content of the initiator is less than 0.1% by weight, it is difficult to obtain a sufficient adhesive strength, and when it exceeds 5% by weight, there is a possibility that the adhesive strength is rather lowered. Considering the effect of improving the adhesive strength due to the adjustment of the content of the initiator, the initiator can be contained more specifically in an amount of 1 to 3% by weight based on the total weight of the adhesive composition.

In the adhesive composition according to an embodiment of the present invention, the second part may further include a toughening agent for improving the mechanical properties of the adhesive composition.

In this case, the toughening agent may be the same as that described above. If the second part further contains a toughening agent, the toughening agent may be included in an amount of 50 to 100 parts by weight based on 100 parts by weight of the epoxy resin.

(C) Other Additives

In addition to the above-mentioned components, the adhesive composition according to one embodiment of the present invention may further include, in at least one of the parts (A) and (B), one or more of additives conventionally known in this field within the range that does not impair the effect of the present invention, specifically additives such as a polymerizable monomer compound, an adhesion promotor, an inhibitor, an accelerator, an antioxidant, a lubricant, an initiator, an oil, a curing agent, or a curing accelerator.

The polymerizable monomer compound is a compound containing at least one polymerizable functional group such as a vinyl group or an acrylic group in the molecule, and specifically it may be a (meth)acrylate compound or a derivative thereof. At this time, the above-mentioned (a1) alkyl(meth)acrylate and (a2) acrylate containing one or more hydroxy groups in the molecule are excluded. Specific examples thereof include bisphenol A polyethylene glycol diether dimethacrylate or phosphate ester of PPG metal methacrylate.

The polymerizable monomer compound can be included in the first part of the adhesive composition, and it may be contained in an amount of 0.1 to 10% by weight, more specifically 0.1 to 5% by weight based on the total weight of the adhesive composition.

The adhesion promotor is a material that forms a crosslink for metal interaction with the metal surface and strengthening the polymer network such as mono-esters of phosphinic acids, and mono- and diesters of phosphonic and phosphoric acids having one unit of vinyl or allylic unsaturated group. More specific examples include phosphoric acid; (meth) acrylated phosphate such as 2-methacryloyloxyethyl phosphate, bis-(2-methacryloyloxyethyl)phosphate, 2-acryloyloxyethyl phosphate, bis-(2-acryloyloxyethyl)phosphate, methyl-(2-methacryloyloxyethyl)phosphate, ethyl methacryloyloxyethyl phosphate, methyl acryloyloxyethyl phosphate, ethyl acryloyloxyethyl phosphate, propyl acryloyloxyethyl phosphate, isobutyl acryloyloxyethyl phosphate, ethylhexyl acryloyloxyethyl phosphate, halopropyl acryloyloxyethyl phosphate, haloisobutyl acryloyloxyethyl phosphate, or haloethylhexyl acryloyloxyethyl phosphate; vinylphosphonic acid; cyclohexene-3-phosphonic acid; (α-hydroxybutene-2-phosphonic acid; (α-hydroxybutene-2 phosphonic acid; 1-hydroxy-1-phenyl methane-1,1-diphosphonic acid; 1-hydroxy-1-methyl-1-disphosphonic acid; 1-amino-1-phenyl-1,1-diphosphonic acid; 3-amino-3-hydroxypropane-1,1-disphosphonic acid; amino-tris(methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl phosphinic acid or allyl methacryloyloxyethyl phosphinic acid. They may be used alone or two or more types thereof may be used in combination.

Examples of the adhesion promotor include (meth)acrylic acid or metal(meth)acrylate (for example, zinc dimethacrylate, etc.).

Such an adhesion promotor may be included in the first part of the adhesive composition, and it may be contained in an amount of 0.5 to 3% by weight, more specifically 0.5 to 1% by weight based on the total weight of the adhesive composition.

The inhibitor also serves to stabilize the adhesive composition and to inhibit premature free radical polymerization of alkyl(meth)acrylate to provide a suitable initiation time. Specific examples thereof include naphthoquinone, anthraquinone, benzoquinone, methylether hydroquinone or the like, and they may be used alone or two or more types thereof may be used in combination.

The inhibitor may be included in the first part of the adhesive composition and may be contained in an amount of 0.01 to 1% by weight, more specifically 0.01 to 0.5% by weight, based on the total weight of the adhesive composition.

The accelerator acts as a catalyst for accelerating or facilitating the curing of the adhesive composition, and specifically includes an amine-based compound.

The amine-based compound may be a secondary amine $HN(R_a)_2$ (where $R_a$ are each independently C4 to C10 alkyl, etc.), a tertiary amine $N(R_b)_3$ (where $R_b$ is each independently selected from the group consisting of C1 to C20 alkyl, C6 to C20 aryl, C7 to C20 alkylaryl and C7 to C20 arylalkyl), an aromatic amine or a heterocyclic amine. More specifically, it may include 1,8-diazabicyclo(5.4.0)undec-7-ene (DBU), 1,4-diazabicyclo(2.2.2)octane (DABCO), triethylamine, guanidine-based compounds (e.g., tetramethylguanidine (TMG), etc.), toluidine-based compounds (e.g., dimethyl-p-toluidine (DMPT), diethyl-p-toluidine (DEPT), dihydroxy ethyl p-toluidine, dimethyl-p-toluidine (DMPT), dimethyl-o-toluidine (DMOT), etc.), aniline-based compounds (e.g., dimethylaniline, dihydroxyethyl aniline, etc.), thiourea-based compounds (e.g., acylthiourea, benzoyl-thiourea, aryl-thiourea, etc.), or pyridine-based compounds (e.g., dihydrophenyl pyridine, etc.), and they may be used alone or two or more types thereof may be used in combination.

The accelerator may be included in the first part of the adhesive composition and may be contained in an amount of 0.1 to 5% by weight, more specifically 0.1 to 1% by weight based on the total weight of the adhesive composition.

In addition, the antioxidant may exhibit an antioxidant effect such as improvement of thermal stability of the adhesive composition, and phosphorous-based, phenol-based, amine-based, or sulfur-based types of antioxidants may be used. Examples of the phosphorus-based antioxidant include phosphate such as triphenylphosphate (TPP), triethylphosphate (TEP); phosphonate such as diethyl(3,5-di-tert-butyl-4-hydroxybenzyl)phosphonate, bis(2,6-di-tert-butyl-4-methylphenyl)pentaerythritol diphosphate, bis(2,4-di-tert-butylphenyl) pentaerythritol diphosphite, bis(2,4-dicumylphenyl)pentaerythritol-diphosphite, or distearyl pentaerythritol diphosphate; phosphinate; phosphine oxide; phosphazene; or metal salts thereof, and they may be used alone or two or more types thereof may be used in combination.

Further, examples of the phenol-based antioxidant include a hindered phenol-based compound such as 2,6-di-tert-butyl-p-cresol, tetrakis[methylene-3-(3,5-di-tert-butyl-4-hydroxyphenyl)propionate]methane, thiodiethylene bis[3-(3,5-di-tert-butyl-4-hydroxyphenyl)propionate], or N,N'-hexane-1,6-diylbis[3-(3,5-di-tert-butyl-4-hydroxyphenylpropionamide], and they may be used alone or two or more types thereof may be used in combination.

The antioxidant may be included in the first part of the adhesive composition and may be contained in an amount of 0.1 to 1% by weight, more specifically 0.1 to 0.5% by weight based on the total weight of the adhesive composition.

Further, the lubricant serves to increase moldability and provide mold releasability when a substrate is detached. Specifically, waxes such as olefin waxes, montan waxes, and montanic ester waxes can be used.

The lubricant may be included in the first part of the adhesive composition, and when the lubricant is contained in an excessive amount, there is a possibility that the moldability is deteriorated. Thus, the lubricant can be contained in an amount of 0.1 to 1% by weight, more specifically, 0.1 to 0.5% by weight based on the total weight of the adhesive composition.

In addition, the adhesive composition can include additives such as an oil (e.g., a benzoate ester-based oil such as an alkyl benzoate); a curing agent (e.g., ethylenediamine trianhydride, etc.); and a curing accelerator (e.g., organic metal salt or an inorganic metal composite including at least one metal selected from the group consisting of iron, copper, zinc, cobalt, lead, nickel, manganese, and tin, such as Cu naphthaleneate, cobalt naphthenate).

The first and second parts having the above-described constitution can exhibit appropriate viscosities through adjustment of the types and content of the constituent components thereof. Specifically, in the adhesive composition according to the present invention, the second part may have a higher viscosity than the first part, more specifically, the viscosity of the first part is 15,000 to 60,000 cp, and the viscosity of the second part is higher than the viscosity of the first part in the range of 50,000 to 80,000 cp.

The adhesive composition according to the present invention can be used by blending the above-mentioned components to prepare the first and second parts, respectively, and then mixing the first part and the second part in use in order to initiate reactive curing. In this case, the first part and the second part may be mixed in a weight ratio of 1:1 to 10:1.

The adhesive composition having the above composition exhibits excellent adhesion strength due to the inclusion of carbon nanotubes, and thus can be used as adhesives, primers, coating agents, or the like, for adhesion of various substrates including metals such as zinc, copper, cadmium, iron, tin, aluminum, silver, chromium, alloys of these metals, and galvanized steel including hot-dip galvanized steel and alloyed galvanized steel, polymers, reinforced plastics, fibers, glass, ceramics, wood, or the like. It can be used for heterojunction such as metal or plastic. The adhesive composition exhibits excellent lap shear strength and can be cured at room temperature. Therefore, the adhesive composition can be usefully used in the field of application requiring large-area high-adhesion and high elongation of large vehicles, particularly, it can be usefully used for the adhesion of a ceiling and a side panel of a bus, a truck trailer, ceilings of train, floors, windows, headlight covers and the like.

Hereinafter, the function and effects of the invention will be described in more detail by way of concrete examples. However, these examples are presented for illustrative purposes only and are not intended to limit the scope of the invention in any way.

The materials used in the following Examples and Comparative Examples are as follows:

A: First part
  a1) alkyl(meth)acrylate: methyl(meth)acrylate (MMA)
  a2) a hydroxyl group-containing (meth)acrylate: 2-hydroxyethyl methacrylate (2-HEMA)
  a3) Toughening agent
    a3-1) Styrene-butadiene-polymethyl methacrylate triblock copolymer
    a3-2) Vinyl terminated butadiene rubber
    a3-3) Chlorinated butadiene rubber
    a3-4) Chlorosulfonated polyethylene
    a3-5) Styrene-butadiene-styrene copolymer
    a3-6) acrylonitrile-butadiene-styrene copolymer
  a4) Filler:
    a4-1) Fumed silica
    a4-2) Nanoclay
    a5)
    a5-1) Multi-walled carbon nanotube (CNT): diameter: 8 to 15 nm, length: 10 to 70 μm, aspect ratio: $1\times10^3$ to $8\times10^3$, specific surface area: 235 to 275 $m^2/g$ (LG Chem. LUCAN CP1001M),
    a5-2) Carbon nanofibers (CNF): diameter: 70 to 200 nm, length: 50 to 200 μm, average aspect ratio: $1\times10^3$, specific surface area: 40 to 50 $m^2/g$ (Pyrograf Product. PR-24-XT-PS)
    a5-3) Carbon nanoparticle (CNP): average diameter: 30 nm, average length: 30 nm, average aspect ratio: 1, specific surface area: 100 $m^2/g$ (Sigma-Aldrich)
    a5-4) Single-walled carbon nanotube (SWCNT): diameter: 1 to 2 nm, length: 100 to 500 μm, aspect ratio: $1\times10^5$ to $5\times10^5$) (Nanoshell SWCNT Array Thermal CVD)
  a6) Other Polymerizable monomer compound
    a6-1) Bisphenol A polyethylene glycol diether dimethacrylate
    a6-2) Phosphate ester of PPG methacrylate
  a7) Adhesion promotor
    a7-1) Methacrylated phosphate a7-2) Methyl acrylic acid
a8) Inhibitor: methyl ether hydroquinone (MEHQ)
a9) Antioxidant: 2,6-di-tert-butyl p-cresol (BHT)
a10) Lubricant: wax (WAX)
a11) Others:
a11-1) Ethylenediamine trianhydride
a11-2) Cu naphthenate
a12) Accelerator:
a12-1) Dimethyl-p-toluidine
a12-2) Dihydrophenylpyridine
B: Second part
b1) Epoxy resin: Epoxy resin (EPO)
b2) Initiator: benzoyl peroxide (BPO)
b3) Oil: Benzoate ester oil (BE oil)
b4) Toughening agent: poly(methacrylate-butadiene-styrene) (PMBS)

EXAMPLES AND COMPARATIVE EXAMPLES

An adhesive composition was prepared by blending the components listed in Table 1 below in the base amount to prepare the first and second parts, respectively, and then mixing them.

TABLE 1

| | Constitution (wt %) | | Comparative Example | | | | | | | Example | | |
|---|---|---|---|---|---|---|---|---|---|---|---|---|
| | | | 1 | 2 | 3 | 4 | 5 | 6 | 7 | 1 | 2 | 3 |
| First part | a1 alkyl(meth)acrylate | MMA | 55.83 | 57.85 | 53.72 | 53.72 | 53.72 | 53.72 | 53.72 | 57.85 | 53.72 | 53.72 |
| | a2 hydroxy group-containing (meth)acrylate | 2-HEMA | 2.6 | 5 | 8 | 8 | 8 | 8 | 8 | 5 | 8 | 8 |
| | a3 toughening agent | a3-1 | 23.93 | — | — | — | — | — | — | — | — | — |
| | | a3-2 | 5.18 | 8.56 | 4.31 | 4.31 | 4.31 | 4.31 | — | 8.56 | 4.31 | 4.31 |
| | | a3-3 | — | 13.87 | — | — | — | — | — | 13.87 | — | — |
| | | a3-4 | — | — | 5.57 | 5.57 | 5.57 | 5.57 | — | — | 5.57 | 5.57 |
| | | a3-5 | — | 2.5 | 6.5 | 6.5 | 6.5 | 6.5 | — | 2.5 | 6.5 | 6.5 |
| | | a3-6 | — | 5.65 | 12.81 | 12.81 | 12.81 | 12.81 | — | 5.65 | 12.81 | 12.81 |
| | a4 Filler | a4-1 | 5 | 2 | 2 | 2 | 2 | 2 | 2 | 2 | 2 | 2 |
| | | a4-2 | 3 | — | — | — | — | — | — | — | — | — |
| | a5 | a5-1 CNT | — | — | — | — | — | — | 0.05 | 0.05 | 0.05 | 0.1 |
| | | a5-2 CNF | — | — | — | 0.05 | — | — | — | — | — | — |
| | | a5-3 CNP | — | — | — | — | 0.05 | — | — | — | — | — |
| | | a5-4 SWCNT | — | — | — | — | — | 0.05 | — | — | — | — |
| | a6 other polymerizable monomer compound | a6-1 | 3.2 | — | 1.4 | 1.4 | 1.4 | 1.4 | 1.4 | — | 1.4 | 1.4 |
| | | a6-2 | 1 | — | 0.24 | 0.24 | 0.24 | 0.24 | 0.24 | — | 0.24 | 0.24 |
| | a7 adhesion promotor | a7-1 | — | 1 | 0.7 | 0.7 | 0.7 | 0.7 | 0.7 | 1 | 0.7 | 0.7 |
| | | a7-2 | — | 0.95 | — | — | — | — | — | 0.95 | — | — |
| | a8 inhibitor | MEHQ | 0.12 | — | 0.02 | 0.02 | 0.02 | 0.02 | 0.02 | — | 0.02 | 0.02 |
| | a9 anti-oxidant | BHT | 0.12 | — | 0.2 | 0.2 | 0.2 | 0.2 | 0.2 | — | 0.2 | 0.2 |
| | a10 lubricant | WAX | — | 0.4 | 0.3 | 0.3 | 0.3 | 0.3 | 0.3 | 0.4 | 0.3 | 0.3 |
| | a11 others | a11-1 | — | — | 0.06 | 0.06 | 0.06 | 0.06 | 0.06 | — | 0.06 | 0.06 |
| | | a11-2 | — | — | 0.001 | 0.001 | 0.001 | 0.001 | 0.001 | — | 0.001 | 0.001 |
| | a12 accelerator | a12-1 | 1 | 1 | 1 | 1 | 1 | 1 | 1 | 1 | 1 | 1 |
| | | a12-2 | 1 | 1 | 1 | 1 | 1 | 1 | 1 | 1 | 1 | 1 |
| Second part | b1 epoxy resin | EPO | 2.1 | 2.1 | 2.1 | 2.1 | 2.1 | 2.1 | 2.6 | 2.6 | 2.6 | 2.6 |
| | b2 initiator | BPO | 3.83 | 3.83 | 3.83 | 3.83 | 3.83 | 3.83 | 2.7 | 2.7 | 2.7 | 2.7 |
| | b3 oil | BE oil | 1.97 | 1.97 | 1.97 | 1.97 | 1.97 | 1.97 | 2.6 | 2.6 | 2.6 | 2.6 |
| | b4 toughening agent | PMBS | 2.1 | 2.1 | 2.1 | 2.1 | 2.1 | 2.1 | 2.1 | 2.1 | 2.1 | 2.1 |

Experimental Example 1

The viscosities of the adhesive compositions prepared in Examples 1 to 3 and Comparative Examples 1 to 3 were measured using a Brookfield viscometer (model: DV1M-RV, spindle No. 7, 20 rpm). The results are shown in Table 2 below. In this case, in order to compare the effects, the results of experiments are also described, together with commercially available adhesives, as reference examples.

TABLE 2

|  | Comparative Example | | | Example | | | Reference Example | | | |
| --- | --- | --- | --- | --- | --- | --- | --- | --- | --- | --- |
|  | 1 | 2 | 3 | 1 | 2 | 3 | Henkel™ H8610 | 3M™ 8425 | Henkel™ E40HT | Henkel™ 3035 |
| Viscosity of first part (cP) | 8,600 | 11,260 | 30,000 | 23,000 | 43,000 | 56,000 | 129,600 | 105,000 | 107,000 | 7,500 |
| Viscosity of second part (cP) | 99,600 | 99,600 | 99,600 | 63,000 | 63,000 | 63,000 | 105,600 | 133,200 | 6,200 | 60,000 |

As a result of the experiment, it was confirmed that the viscosity of the first part of the adhesive composition of Examples 2 and 3 increased with an increase in the amount of the carbon nanotubes.

Experimental Example 2

The adhesive compositions prepared in Examples 1 to 3 and Comparative Examples 1 to 3 were coated onto various substrates as shown in Table 3 below, and the lap shear strength was measured by the method of ASTM D1002.

Specifically, the adhesive compositions prepared in Examples and Comparative Examples were respectively coated to a panel having a dimension of 101.6×177.8×1.6 mm, and glass beads with a size of 250 μm was sprayed. At this time, the coating of the adhesive composition was carried out by putting the first part of the adhesive composition into 10 part of a 10:1 double syringe cartridge dispenser, putting the second part in the 1 part of the double syringe cartridge dispenser, and then quantitatively discharging the adhesive composition through static mixing tips. Each panel adhered with the adhesive composition was fixed with a binder clip at 25° C. for 24 hours, and then the fixed panel was cut to a width of 25.4 mm to obtain five test specimens for each. The lap shear strength was measured on a 50 kN cell using INSTRON UTM equipment and expressed as the mean value of five specimens. The results are shown in Table 3 below. In order to compare the effects, the results of the experiments are also described together with commercially available adhesives as a reference example.

TABLE 3

| Lap shear strength (MPa) | | Comparative Example | | | Example | | | Reference Example | | | |
| --- | --- | --- | --- | --- | --- | --- | --- | --- | --- | --- | --- |
|  |  | 1 | 2 | 3 | 1 | 2 | 3 | Henkel™ H8610 | 3M™ 8425 | Henkel™ E40HT | Henkel™ 3035 |
| Types of substrate | Cold rolled steel | 18.5 | 16.4 | 21.1 | 20.1 | 24.5 | 23.6 | 22.3 | 23 | — | — |
|  | Stainless steel | — | — | 24.3 | 20.7 | 24.8 | 24.1 | 26 | 21.5 | 27 | — |
|  | aluminum | — | — | 14.3 | 17.3 | 14.9 | 14.1 | 18.1 | 13.2 | 11.7 | — |
|  | polycarbonate | 8.5 | — | — | 9.3 | — | 10 | 4.7 | 8.6 | 2.7 | 4.3 |

In Table 3 above, "-" means that it is not measured.

As a result of the experiment, the adhesive compositions of Examples 1 to 3 including carbon nanotubes exhibited excellent lap shear strength for various types of substrates as compared with Comparative Examples and Reference Examples. In particular, when the substrate is a polymer such as polycarbonate, the lap shear strength greatly increased as compared with Comparative Examples and Reference Examples.

Experimental Example 3

In addition, in order to evaluate the effect of forming composites of the CNT and toughening agent in the adhesive composition, the viscosity and lap shear strengths of the adhesive compositions prepared in Comparative Examples 4 to 7 were measured in the same manner as in Experimental Examples 1 and 2, respectively. The results are shown in Table 4 together with the results of Example 2 and Comparative Example 3.

TABLE 4

|  | Comparative Example | | | | | Example |
| --- | --- | --- | --- | --- | --- | --- |
|  | 3 | 4 | 5 | 6 | 7 | 2 |
| a5 carbon-based material | — | a5-2 CNF | a5-3 CNP | a5-4 SWCNT | a5-1 CNT | a5-1 CNT |
| a3 inclusion of the toughening agent | ○ | ○ | ○ | ○ | X | ○ |
| Viscosity of first part(cP) | 30,000 | 35,000 | 39,000 | 48,000 | 800 | 43,000 |
| Lap shear strength (MPa) (Cold rolled steel) | 21.1 | 23.2 | 21.3 | 20.7 | 1.9 | 24.5 |

As a result of the experiment, it was confirmed that the adhesive composition of Example 2 including the toughening agent together with CNT exhibited the highest lap shear strength and had the most excellent adhesion properties. On the other hand, the case of using only a toughening agent without CNT (Comparative Example 3) or the case of using only CNT without toughening agent (Comparative Example 7) exhibited reduced viscosity and lap shear strength. From this, it can be seen that the adhesive strength due to the effect of forming composites can be improved by simultaneously including the CNT and the toughening agent.

In addition, the composition of Comparative Example 5 containing CNP which does not satisfy the morphological condition instead of CNT and the composition of Comparative Example 6 which includes the SWCNT which has a very high aspect ratio exhibited the same level of low adhesive strength as Comparative Example 3 which does not contain CNT. On the other hand, Comparative Example 4 including CNF exhibited a higher lap shear strength than Comparative Examples 5 and 6 including CNP or SWCNT, but exhibited a lower adhesive strength than Example 2 due to the structural difference. From this, it can be confirmed that when the characteristic structure of CNT is satisfied, the effect of forming composites with the toughening agent can be further increased, and as a result, the adhesion strength can be improved.

The invention claimed is:

1. A two-part adhesive composition comprising: (A) a first part comprising the following components (a1) to (a5); and (B) a second part comprising the following components (b1) and (b2), based on the total weight of the adhesive composition:
   (a1) 30 to 70% by weight of an alkyl(meth)acrylate;
   (a2) 1 to 10% by weight of an acrylate containing one or more hydroxy groups in the molecule;
   (a3) 20 to 40% by weight of a toughening agent;
   (a4) 1 to 10% by weight of a filler, and
   (a5) 0.01 to 1% by weight of a carbon nanotube,
   (b1) 1 to 10% by weight of an epoxy resin, and
   (b2) 1 to 5% by weight of an initiator.

2. The two-part adhesive composition of claim 1, wherein the (a1) alkyl(meth)acrylate is a (meth)acrylate containing a linear or branched alkyl group having 1 to 20 carbon atoms.

3. The two-part adhesive composition of claim 1, wherein the (a1) alkyl(meth)acrylate is selected from the group consisting of methyl methacrylate, ethyl(meth)acrylate, n-propyl(meth)acrylate, isopropyl(meth)acrylate, n-butyl (meth)acrylate, t-butyl(meth)acrylate, sec-butyl(meth)acrylate, pentyl(meth)acrylate, 2-ethylhexyl(meth)acrylate, n-octyl(meth)acrylate, isooctyl(meth)acrylate, isononyl (meth)acrylate, lauryl(meth)acrylate and tetradecyl(meth) acrylate.

4. The two-part adhesive composition of claim 1, wherein the (a2) acrylate containing one or more hydroxy groups in the molecule is selected from the group consisting of 2-hydroxyethyl(meth)acrylate, 2-hydroxypropyl(meth)acrylate, 4-hydroxybutyl(meth) acrylate, 2-hydroxyethyleneglycol (meth)acrylate, and 2-hydroxypropyleneglycol(meth)acrylate.

5. The two-part adhesive composition of claim 1, wherein the (a3) toughening agent comprises any one or a mixture of two or more of those selected from the group consisting of a rubber, a rubber copolymer and a rubber derivative.

6. The two-part adhesive composition of claim 1, wherein the (a3) toughening agent comprises any one or a mixture of two or more of those selected from the group consisting of vinyl terminated butadiene rubber, chlorinated butadiene rubber, chlorosulfonated butadiene rubber, nitrile butadiene rubber, styrene butadiene rubber, silicone rubber, styrenebutadiene-polymethylmethacrylate triblock copolymer, acrylonitrile-butadiene-styrene copolymer and styrene-butadiene-styrene copolymer.

7. The two-part adhesive comp of claim 1, wherein the (a4) filler comprises any one or a mixture of two or more of those selected from the group consisting of a silica, a fumed silica and a nanoclay.

8. The two-part adhesive composition of claim 1, wherein (a5) carbon nanotube has an aspect ratio of $1 \times 10^2$ to $1 \times 10^5$.

9. The two-part adhesive composition of claim 1, wherein the (a5) carbon nanotube has a diameter of 1 to 50 nm and a length of 10 to 120 μm.

10. The two-part adhesive composition of claim 1, wherein the (a5) carbon nanotube has a BET specific surface area of 150 $m^2$/g or more.

11. The two-part adhesive composition of claim 1, wherein the (a5) carbon nanotube comprises any one or more selected from the group consisting of a single-walled carbon nanotube, a double-walled carbon nanotube and a multi-walled carbon nanotube.

12. The two-part adhesive composition of claim 1, wherein the (a5) carbon nanotube is present in an amount of 10 to 40 parts by weight based on 100 parts by weight of the (a3) toughening agent.

13. The two-part adhesive composition of claim 1, wherein a composite is formed by physical bonding between the (a3) toughening agent and the (a5) carbon nanotubes.

14. The two-part adhesive composition of claim 13, wherein the (a3) toughening agent comprises vinyl terminated butadiene rubber, chlorosulfonated polyethylene, styrene-butadiene-styrene copolymer and acrylonitrile-butadiene-styrene copolymer, and the vinyl terminated butadiene rubber is comprised in an amount of 10 to 30% by weight based on the total weight of the toughening agent; and the (a5) carbon nanotube is a multi-walled carbon nanotube having an aspect ratio of $5 \times 10^2$ to $5 \times 10^4$, a diameter of 5 to 20 nm, a length of 10 to 100 μm, and a specific surface area of 200 $m^2$/g to 500 $m^2$/g.

15. The two-part adhesive composition of claim 1, wherein the (b1) expoxy resin is selected from the group consisting of cycloaliphatic epoxide, epoxy novolac resin, bisphenol-A epoxy resin, bisphenol-F epoxy resin, bisphenol-A epichlorohydrin epoxy resin, alkyl epoxide, dicyclopentadiene phenol addition reaction based epoxy resin, limonene dioxide and polyepoxide.

16. The two-part adhesive composition of claim 1, wherein the (b2) initiator comprises any one or a mixture of two or more of those selected from the group consisting of hydrogen peroxide, alkyl peroxide, alkyl hydroperoxide, arylalkyl peroxide and peroxy ester.

17. The two-part adhesive composition of claim 1, wherein the (B) second part further comprises a toughening agent in an amount of 50 to 100 parts by weight based on 100 parts by weight of the (b1) epoxy resin.

18. The two-part adhesive composition of claim 1, further comprising one or more types of additives selected from the group consisting of a polymerizable monomer compound, an adhesion promotor, an inhibitor, an accelerator, an antioxidant, a lubricant, an initiator, an oil, a curing agent, and a curing accelerator.

* * * * *